April 26, 1938.  A. H. KELLING  2,115,170
MANUFACTURE OF STARCH
Original Filed June 5, 1933  2 Sheets-Sheet 1
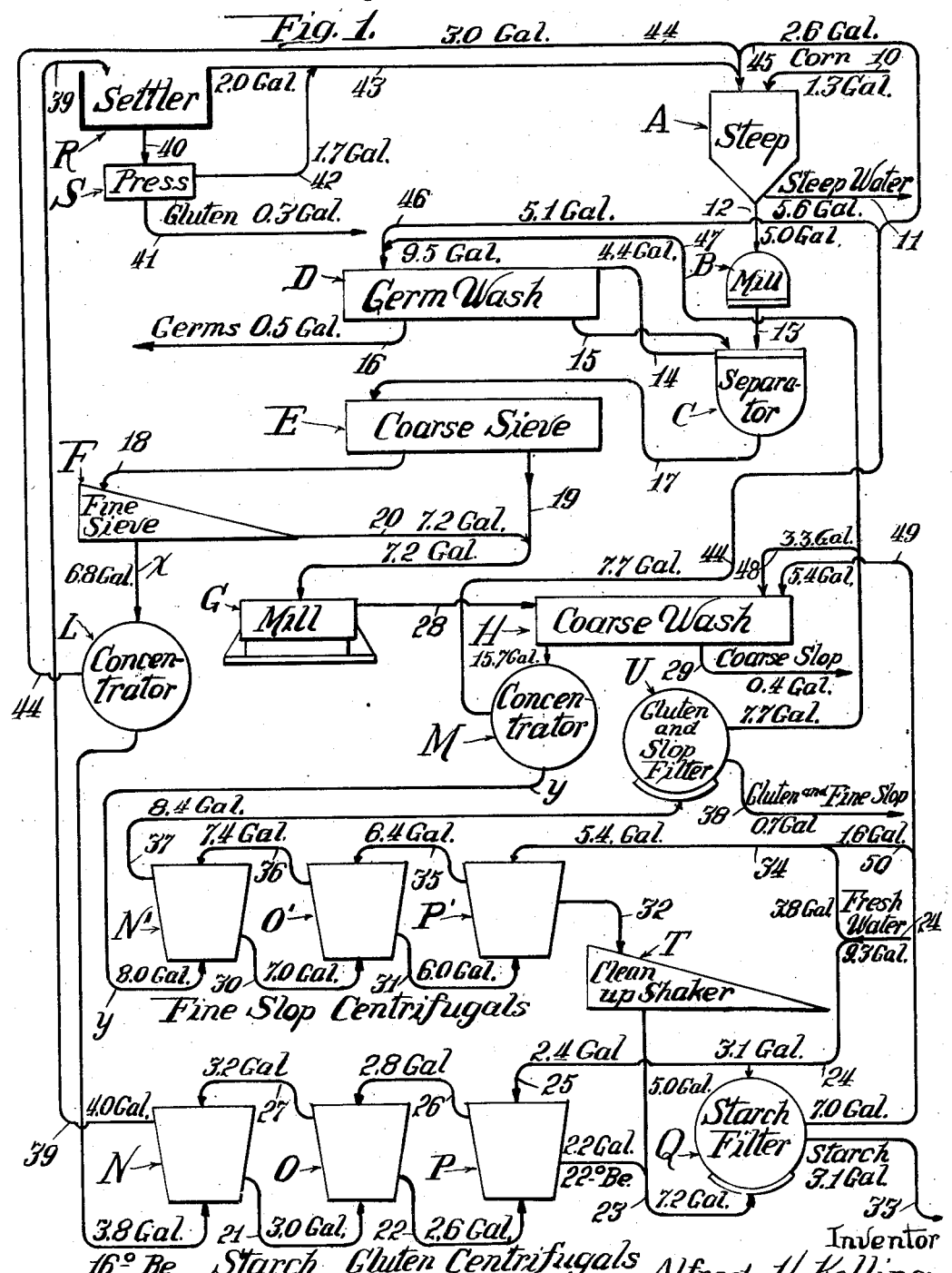

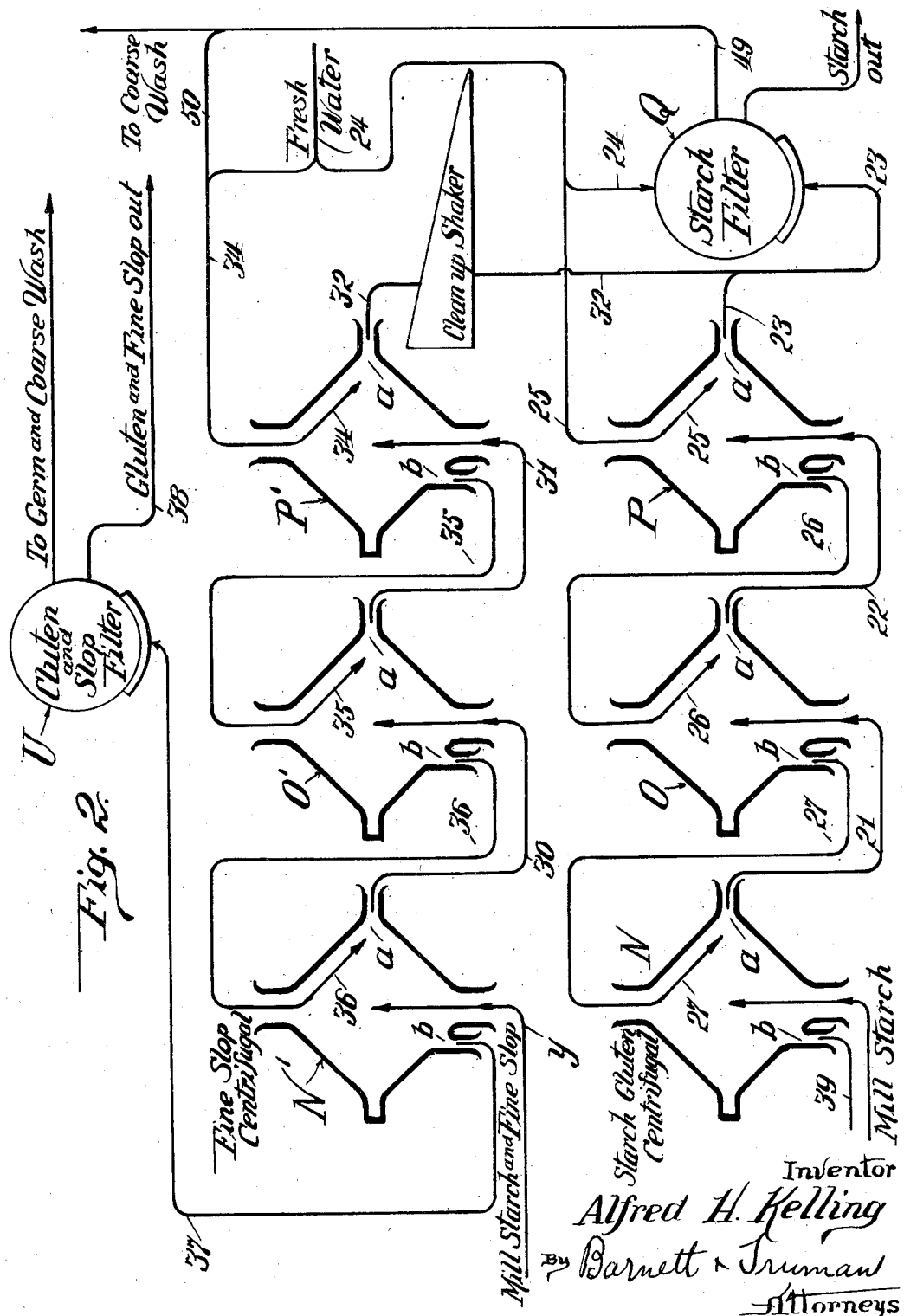

Patented Apr. 26, 1938

2,115,170

UNITED STATES PATENT OFFICE 2,115,170

MANUFACTURE OF STARCH

Alfred H. Kelling, Oak Park, Ill., assignor to International Patents Development Company, Wilmington, Del., a corporation of Delaware Original application June 5, 1933, Serial No. 674,366. Divided and this application June 4, 1936, Serial No. 83,542

2 Claims. (Cl. 127—68)

This invention relates to the manufacture of starch from corn by the wet method; and particularly to a process in which all, or substantially all, of the process waters (except the steep water and the water absorbed in the discharged solids) are returned to the process for reuse for the purpose of saving the solids, soluble and insoluble therein, and preventing the pollution of streams which results from discharging process waters from the factory.

In the manufacture of starch from corn it has been customary to steep the corn and withdraw the steep water to evaporators for recovery of the corn solubles contained therein. The steeped corn is then comminuted and subjected to separating operations in water for removal of the germs, hulls and fiber. The usual method has been to break up the corn coarsely, remove the germs, grind the residue as finely as possible, and then subject the ground material to what is known as a coarse slop washing or separating operation in which starch and gluten are washed from the slop (hulls and fiber) by passing the material through copper reels or over copper covered shakers. The starch milk from this operation is then passed through fine sieves to remove therefrom the residual slop particles, which latter are thereupon subjected to a fine slop washing or separating operation in a series of silk covered reels, or on silk covered shakers, for the purpose of washing out of this fine slop and the starch and gluten which it contains. The mill starch streams (starch, gluten and water) from the germ, coarse slop and fine slop separating operations are then combined and tabled, according to customary practice, for the purpose of separating the gluten from the starch. The starch removed from the tables by flushing, or otherwise, is dewatered and washed with fresh water in washing filters. The gluten is allowed to settle in gluten settlers. The starch filtrate and wash water and gluten settler water are returned to the process for re-use.

In copending application of Alfred H. Kelling, filed June 12, 1933, Serial No. 675,412, a method is disclosed whereby centrifugal machines are used in place of the starch tables for the separation of the gluten from the starch, in an arrangement which permits the return to the system of all the process waters in a manner particularly advantageous to the successful working of the process. In copending application Serial No. 674,366, filed June 5, 1933, of which the present application is a division, there is disclosed a process, with certain modifications, whereby centrifugals are used not only for the separation of gluten from starch but for the separation of the fine slop from the coarse slop mill starch and the washing of the fine slop to remove its starch and gluten; this improvement, therefore, doing away with the sieves through which the mill starch from the fine slop is passed, and also the system of silk reels and/or shakers constituting the fine slop wash which are expensive and inconvenient to maintain and keep in repair. In the process of application 674,366 the arrangements are such that all of the process waters are returned to the process, except the steep water and water contained in the discharged solids, none going to the sewer; and this return of process waters, moreover, is effected in such manner that the water which by the nature of the process contains a relatively large quantity of soluble substances and which is obliged to remain in the process for a considerable length of time, viz: the gluten settler water is returned to the process at the steeps, that is, at the stage of the process from which solubles are withdrawn for recovery, so that this water, which is likely to be highly infected with micro-organisms, is excluded from the separating operations where it would contaminate the starch to a greater or less extent. The process waters re-used in the germ and slop systems are, according to the arrangement disclosed in the application last referred to, waters which contain relatively small quantities of solubles and which have remained in the process only a short time, about two hours. The gluten containing water stands in the gluten settlers for some time, usually twenty-four hours and longer, at a temperature particularly favorable to the incubation of micro-organisms. These organisms produce, if admitted to the separating operations, impurities of a colloidal character which cannot be completely washed out of the starch even by repeated filtering operations.

Furthermore, in accordance with these inventions, the centrifuging operation or operations are carried on so that solubles and other impurities are eliminated from the process water or waters destined to be returned to the separating operations and are concentrated in the process water intended to be reused, exclusively, for steeping. As a result the steps of the process subsequent to the steeping operation are carried on with water which is relatively pure due to the fact that all process waters are repeatedly returned to the system.

No inconvenience results from the re-use for steeping of a more or less highly infected water containing relatively large quantities of solubles and other impurities. The corn material at the steeping stage is in the form of unbroken kernels, not particularly susceptible to either micro-organic action or contamination by impurities, and micro-organic activity is discouraged by the high temperatures and sulphur dioxide concentrations used in steeping. In the wet starch operations, however, that is in the germ and coarse and fine slop separations, the temperatures and sulphur dioxide concentrations are lower and the material is in a finely divided state and particularly susceptible to micro-organic action and to contamination by soluble substances. By concentrating the solubles, micro-organisms and other impurities in the process water returned to the steeps and by using relatively pure process waters in the separating operations a purer starch is obtained and also one which is whiter since the substances tending to give corn starch a yellowish tinge are included among the impurities which according to the present process are concentrated to a very considerable extent in the gluten settler water which is used exclusively in the steeping operation.

The present invention provides certain arrangements whereby it is possible to use centrifugal equipment, or to obtain a better separation with the same equipment; the mill starch being delivered to the starch-gluten centrifugals at a higher density and in smaller volume than in other forms of the invention disclosed in the parent application.

The process is illustrated in the accompanying drawings in which

Fig. 1 is a flow-sheet diagram of the whole process; and

Fig. 2 is a more detailed diagram illustrating the centrifugal system.

In Fig. 1 of the drawings the numerals followed by the abbreviation "Gal." represent gallons of water present per bushel of corn ground. It will be understood that these water balance figures are merely illustrative. The apparatuses used are shown diagrammatically. In practice a number of units will be used in parallel ordinarily, where a single unit is shown in the drawings. The term "pipe" as used in the description is intended to include any conduit, trough, conveyor or other means for moving the material from stage to stage of the process.

Referring first to Fig. 1: A designates one of the tanks of the steeping system which ordinarily consists of a plurality of steeping tanks arranged for counter-current operation; B the mill for breaking up the steeped corn so as to free the germs; C the germ separator containing a starch liquor of such gravity that the germs will float off while the rest of the corn sinks to the bottom of the vessel; D the germ washing system; E a coarse sieve which receives the degerminated corn; F a fine sieve for screening the liquid from the coarse sieve E; G a mill for fine grinding the tailings from the coarse sieve E and fine sieve F; H the coarse slop washing system; N, O and P a series of centrifugals for separating the gluten from the starch in the mill starch stream coming from the germ system through fine sieve F; and N', O' and P' a similar series of centrifugal machines which take the place of the silk reels or shakers, commonly used for removing the fine slop from the coarse slop mill starch and washing the fine slop to remove the starch and gluten particles adhering; Q a starch filter in which the starch from the centrifugals is first dewatered and then washed with fresh water; R a gluten settler for removal of gluten from the overflow from the centrifugal N; and S a press for pressing the water out of the gluten which has subsided in settler R. T is a clean-up shaker arranged in the starch line between centrifugal P' and starch filter Q. L and M are concentrators for removing water from the mill starch derived from the germ and coarse slop systems. U is a filter for filtering the overflow, containing gluten and fine slop, from the centrifugal N'.

It will be understood that the centrifugal systems may contain a larger or smaller number of centrifugal machines than shown; and that if desired the starch may be filtered successively in two or more starch filters.

The connections between the apparatuses above named will be referred to in the following description of the operation of the process.

*Operation of process.*—The corn containing 1.3 gallons of water enters the steeping system A at 10 and 5.6 gallons of steep water is drawn off at 11 and sent to the evaporators (not shown) for concentration and saving of soluble substances. The steeped corn passes through pipe 12, with 5.0 gallons of water, to the mill B and the coarse ground corn from the mill B through pipe 13 to the separator C. The germs pass through pipe 14 from the separator C to the germ washing system D, starch liquor passing back through pipe 15 to the separator C, in order to supply a fluid of the proper gravity for floating off the germs. The latter are discharged from the germ washing system D, with 0.5 gallon of water at 16. The degerminated corn passes from the separator C through pipe 17 to the coarse sieve E, and the liquid from the coarse sieve E through pipe 18 to the fine sieve F. The tailings from the coarse sieve E pass through pipe 19 to the mill G and are joined by the tailings from the fine sieve F, as indicated at 20, the material entering the mill carrying 7.2 gallons of water. The mill starch (starch, gluten and water) from the fine sieve F, that is to say from the germ system, passes into pipe $x$, the amount being 6.8 gallons. Pipe $x$ leads to the centrifugal N but has arranged therein a concentrator L, which may be a settling tank but is preferably a filter, the function of which is to extract water from the mill starch. In the water balance arrangement shown the concentrator L extracts 3.0 gallons of water from the mill starch stream $x$ the volume of which is therefore decreased, as it enters the centrifugal N, to 3.8 gallons. The density of the liquid entering the centrifugal is about 16° Baumé. The underflow from centrifugal N, principally starch (3.0 gallons) passes through pipe 21 to centrifugal O; and the underflow from centrifugal O (2.6 gallons) through pipe 22 to centrifugal P. The underflow from centrifugal P (2.2 gallons, density 22° Baumé) passes through pipe 23 to the starch washing filter Q. The starch filter Q receives 3.1 gallons of fresh water from the fresh water supply pipe 24 and 2.4 gallons of fresh water goes through branch pipe 25 to centrifugal P. The overflow from centrifugal P (2.8 gallons) carrying the gluten, passes through pipe 26 to centrifugal O; and the overflow from centrifugal O (3.2 gallons) passes through pipe 27 to centrifugal N.

The finely ground material in mill G passes through pipe 28 to the coarse slop wash H from which the coarse slop is discharged, with 0.4 gallon of water at 29. The mill starch from the coarse slop system is discharged through pipe $y$ to the centrifugal N', the amount discharged from the coarse slop system being 15.7 gallons. Concentrator M is arranged in the pipe $y$ and extracts 7.7 gallons of water from the coarse slop mill starch which, therefore, is reduced in volume, in entering the centrifugal N' to 8.0 gallons. The underflow from centrifugal N' passes through pipe 30 to centrifugal O', the amount being 7.0 gallons; and the underflow from centrifugal O', 6.0 gallons, passes through pipe 31 to centrifugal P'. The underflow from centrifugal P' passes through pipe 32 to pipe 23 and starch filter Q, a clean-up shaker T being arranged in pipe 32 so as to remove from the starch any residual slop particles. The starch stream through pipe 32 is 5.0 gallons which, with the starch from the centrifugal P gives 7.2 gallons delivered to the starch filter Q. The starch is delivered from filter Q at 33 with 3.1 gallons of water. 5.4 gallons of fresh water enter the centrifugal P' through pipe 34. The overflow from centrifugal P', 6.4 gallons, carrying gluten and fine slop, enters centrifugal O' through pipe 35; and the overflow from centrifugal O', 7.4 gallons, passes through pipe 36 to centrifugal N'. The overflow from centrifugal N' passes through pipe 37 to the filter U from which gluten and fine slop are discharged at 38 with 0.7 gallon of water.

Preferably in each centrifugal system the fresh water introduced into the last centrifugal and the overflow from one centrifugal to the next, as the case may be, enters the underflow of starch zone of the centrifugal into which it is introduced, as shown in Fig. 2 where $a$ designates the underflow zone in each centrifugal and $b$ the outlet from the overflow zone. As a result of this the solubles in the liquids treated are concentrated in the overflow. This is due in part to the dilution of the material in the starch zones of the centrifugals; but the actual extent of this concentration of solubles cannot be accounted for, on mathematical grounds, on the basis of dilution alone. Water containing solubles is split from the starch milk entering before mingling with the wash water and thus the wash liquid, fresh water or overflow, displaces the solubles containing water in the starch zone. This concentration of the solubles in the overflow, which continues progressively, throughout the system in the direction counter to the underflow, facilitates the washing of the starch in the starch filters, so that it may be said that the centrifugals take the place, in part, of starch filters.

The process waters are returned to the process as follows:

The overflow from centrifugal N, 4.0 gallons, passes through pipe 39 to the settler R, the gluten from which passes through pipe 40 to the press S from which the gluten is discharged at 41 containing 0.3 gallon of water. The water from the press S passes through pipe 42 to the pipe 43 which conducts the water from the settler R to the steeping system A; the amount of water from the press being 1.7 gallons and that from the settler 2.0 gallons. This amount of water is insufficient for the steeping of the corn and the 3.0 gallons of water extracted from the germ system mill starch by concentrator L is delivered through pipe 44 to the steeps A. The concentrator M extracts 7.7 gallons of water from the coarse slop mill starch, and 2.6 gallons of this water pass through pipe 45 to the steeps A. The rest passes through pipe 46 to the germ wash D.

Of the water from filter U, 7.7 gallons in all, 4.4 gallons go to the germ wash D through pipe 47 and 3.3 gallons to the coarse slop system H through pipe 48.

Of the filtrate and wash water from starch filter Q, 7.0 gallons in all, 5.4 gallons go to the coarse slop system H through pipe 49 and 1.6 gallons to centrifugal P' through pipe 50.

This is a very advantageous arrangement as the waters used in the steps of the process subsequent to steeping the corn are very dilute in respect to solubles, coloring matter and impurities and are relatively free from micro-organisms.

The concentration of the liquors going to the centrifugal systems has the advantage of reducing the amount of centrifugal equipment required, and centrifugal machines are relatively expensive and costly to operate and maintain. The concentration of the liquors has a further advantage in that the higher density liquors can be more advantageously handled for the separation of the starch and gluten than liquors of the density of those derived, in ordinary practice, from the separating operations.

It is the intention to cover all modifications of the described process within the scope of the appended claims. However no claim is made herein to any invention common to this application and the other forms disclosed in application Serial No. 674,366 of which this is a division, the generic claims having been made in the parent case and other forms being claimed specifically in other divisional applications.

I claim:

1. The process of manufacturing starch from corn comprising: steeping and comminuting the corn; subjecting the comminuted corn to germ and coarse slop washes; concentrating the mill starch from the germ wash, by elimination of water, and subjecting it to a centrifuging operation against a counter-current wash water; removing the gluten from the overflow of said centrifuging operation by settling; returning the settler water to the steeping operation; concentrating the mixture of starch gluten and fine slop from the coarse slop wash and subjecting it to a centrifuging operation against a countercurrent wash water; filtering the overflow from the second mentioned centrifuging operation to remove gluten and slop; and reusing in the process steps following the steeping operation process waters derived from said concentrating and filtering operations.

2. Process of manufacturing starch from corn which comprises: steeping and comminuting the corn; subjecting the comminuted corn to germ and coarse slop washes; concentrating the mill starch from the germ wash by elimination of water and subjecting the concentrated mill starch to a centrifuging operation against a counter-current wash water; removing the gluten from the overflow from the centrifuging operation by settling and returning substantially all of the settler water to the steeping operation; concentrating the mixture of starch gluten and fine slop from the coarse slop wash, by elimination of water, and subjecting the concentrated material to a centrifuging operation against a countercurrent wash water; filtering the overflow from the last named centrifuging operation to remove gluten and fine slop; washing the starch from said centrifuging operations; and re-using in the process the process waters derived from said concentrating operation and said gluten and starch filtering operations at points in the process nearer the steeping end of the system in proportion to the solubles content of said process water respectively.

ALFRED H. KELLING.